United States Patent [19]  
Larroche

[11] Patent Number: 4,717,575  
[45] Date of Patent: Jan. 5, 1988

[54] METHOD FOR CANNING FOOD PRODUCT

[76] Inventor: Michel H. R. Larroche, 12, Allée Lamartine, 47300 Villeneuve-sur-Lot, France

[21] Appl. No.: 714,270

[22] Filed: Mar. 21, 1985

[30] Foreign Application Priority Data

Mar. 22, 1984 [FR] France ................... 84 40437  
Mar. 14, 1985 [FR] France ................... 85 03782

[51] Int. Cl.⁴ .................. B65B 31/02; B65B 55/14; A23L 3/02

[52] U.S. Cl. .................. 426/402; 426/397; 426/404; 426/407; 53/407; 53/408; 53/425; 53/431; 53/432; 53/440; 220/67; 220/366

[58] Field of Search ............... 426/402, 403, 404, 407, 426/399, 400, 401; 53/407, 408, 425, 432, 440, 431; 220/366, 67, 355

[56] References Cited

U.S. PATENT DOCUMENTS

| | | | |
|---|---|---|---|
| 1,279,379 | 9/1918 | Sellars | 426/402 |
| 1,355,091 | 10/1920 | Davies . | |
| 1,356,614 | 10/1920 | Fleming | 426/402 |
| 1,365,673 | 1/1921 | Fenn | 426/402 |
| 1,378,531 | 5/1921 | Fenn | 426/402 |
| 1,557,358 | 10/1925 | Grab | 426/402 |
| 1,604,402 | 10/1926 | Fleischer . | |
| 1,625,207 | 4/1927 | Hansen | 426/402 |
| 1,689,641 | 10/1928 | Pickles | 220/67 |
| 1,766,173 | 6/1930 | Hills | 220/67 |
| 1,772,933 | 8/1930 | Fenn | 426/402 |
| 1,857,450 | 5/1932 | Hansen | 426/402 |
| 1,863,447 | 6/1932 | Kronquest | 426/402 |
| 2,153,542 | 4/1939 | Ball | 426/401 |
| 2,268,563 | 1/1942 | Ball . | |
| 2,303,422 | 12/1942 | Ball | 426/401 |
| 2,321,408 | 6/1943 | Mills et al. | 220/67 |
| 2,338,003 | 12/1943 | Mills et al. | 426/403 |
| 2,549,216 | 4/1951 | McK. Martin | 426/399 |
| 2,555,230 | 5/1951 | Ford | 426/403 |
| 2,630,957 | 3/1953 | Hohl et al. | 226/82 |
| 2,639,991 | 5/1953 | Ball | 426/399 |
| 2,745,755 | 5/1956 | Anderson | 426/403 |
| 4,014,153 | 3/1977 | Wilson | 426/506 |
| 4,156,741 | 5/1979 | Beauvais et al. | 426/402 |
| 4,206,854 | 6/1980 | Takami | 220/366 |
| 4,254,152 | 3/1981 | Janovtchik | 426/399 |

Primary Examiner—Steven Weinstein  
Attorney, Agent, or Firm—Steinberg & Raskin

[57] ABSTRACT

The present invention relates to a canned aqueous food product contained in a hermetically closed rigid container. According to the invention, the pressure inside of the container as measured at 20° C. has a value between 3,300 and 6,600 pascals and the partial pressure of steam is at least equal to 40% of said pressure. The invention is in particular applicable to the canned food industry.

6 Claims, 16 Drawing Figures

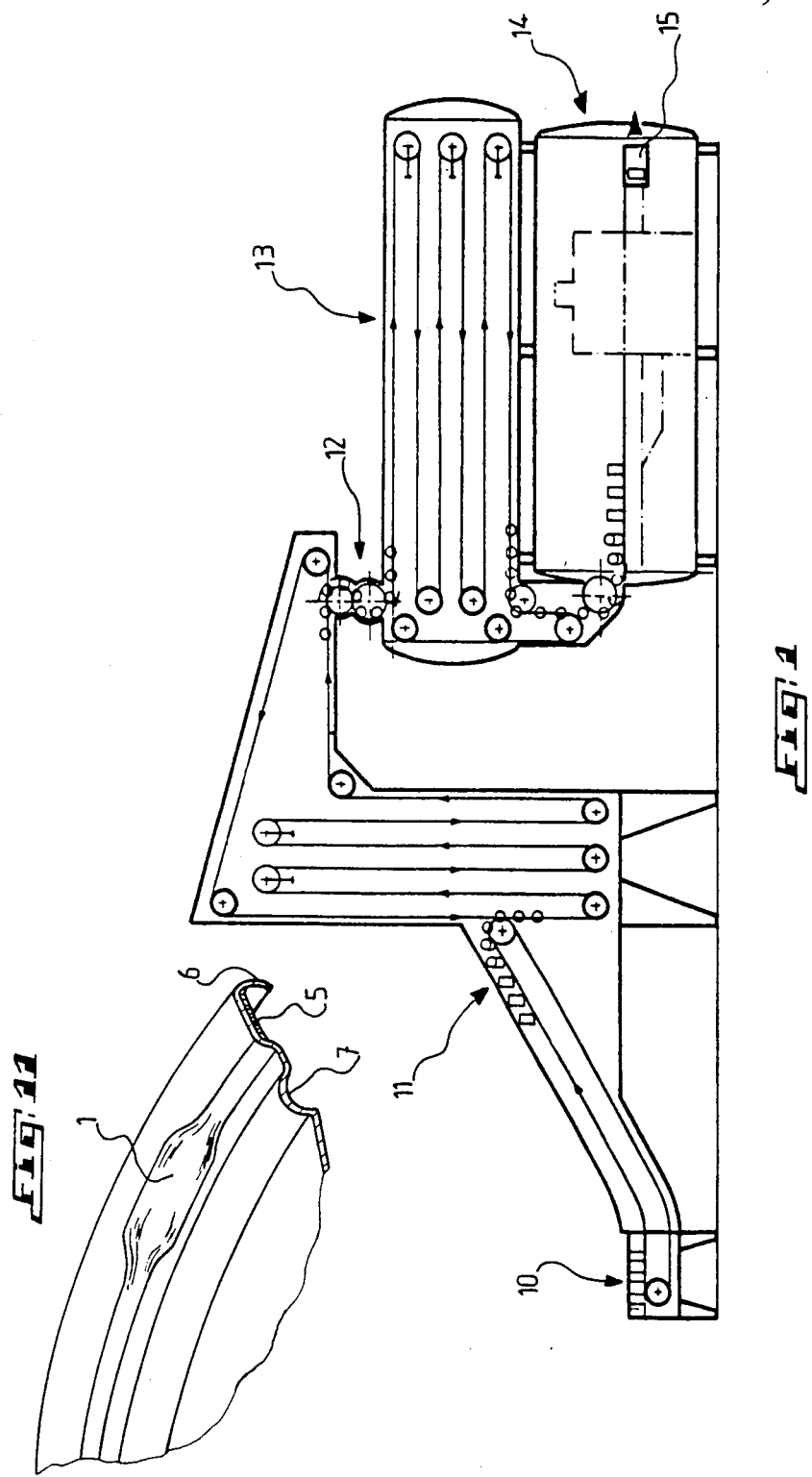

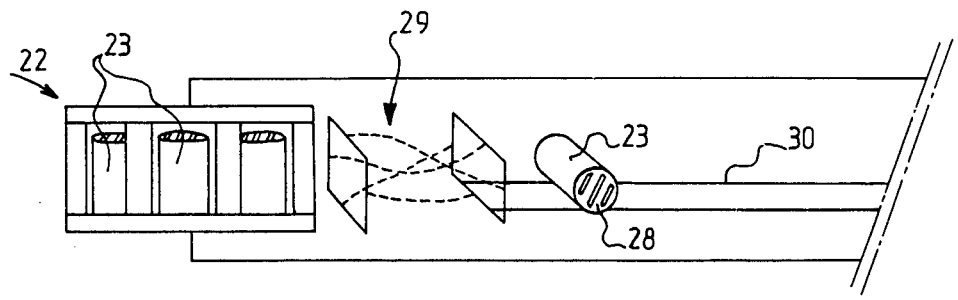
Fig. 3
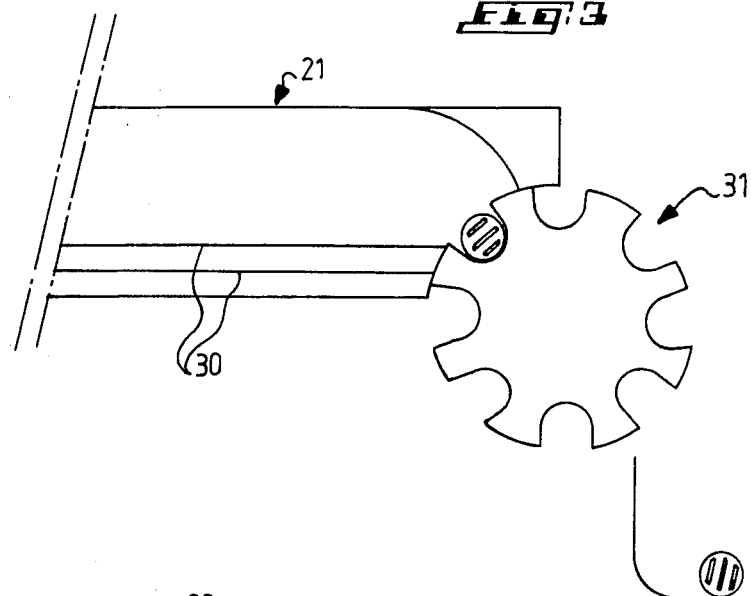
Fig. 2
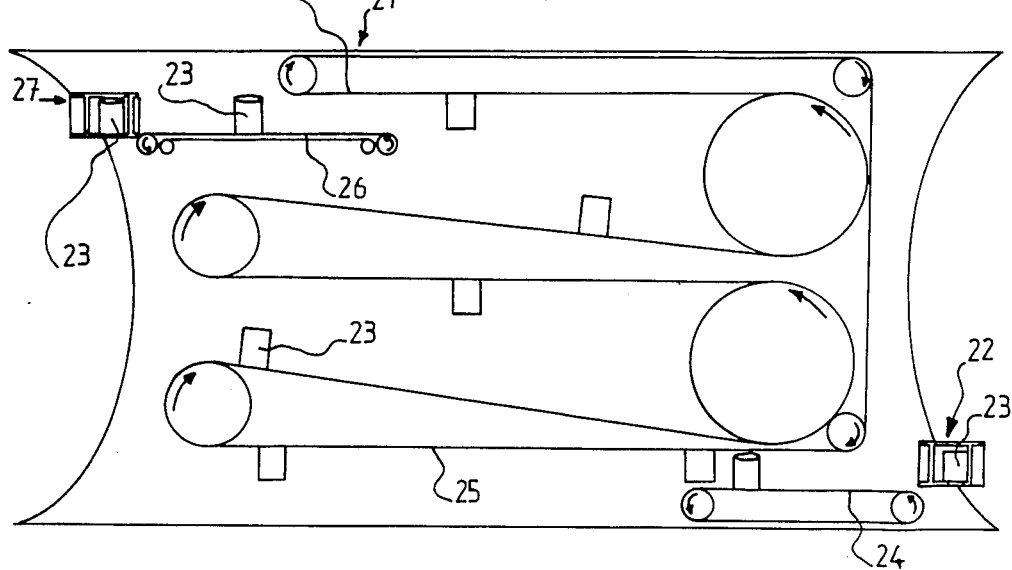

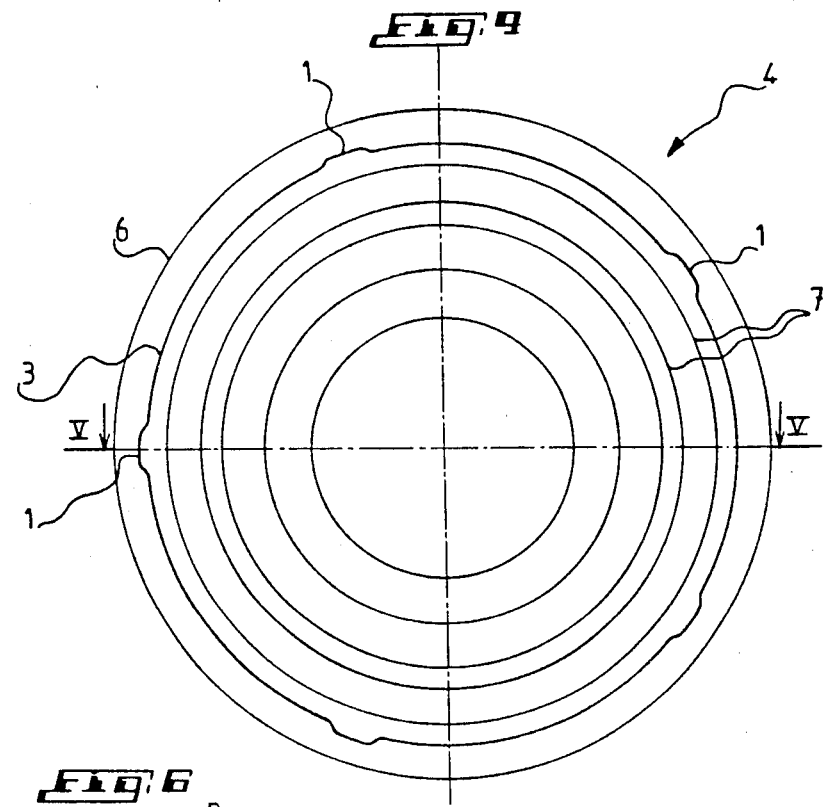
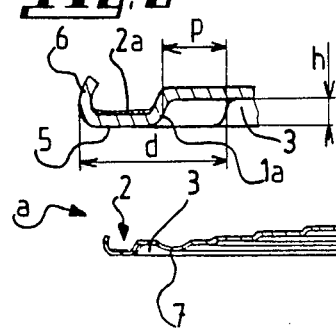
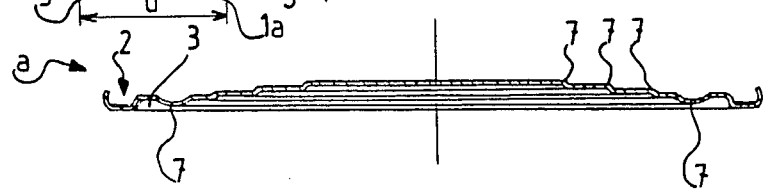
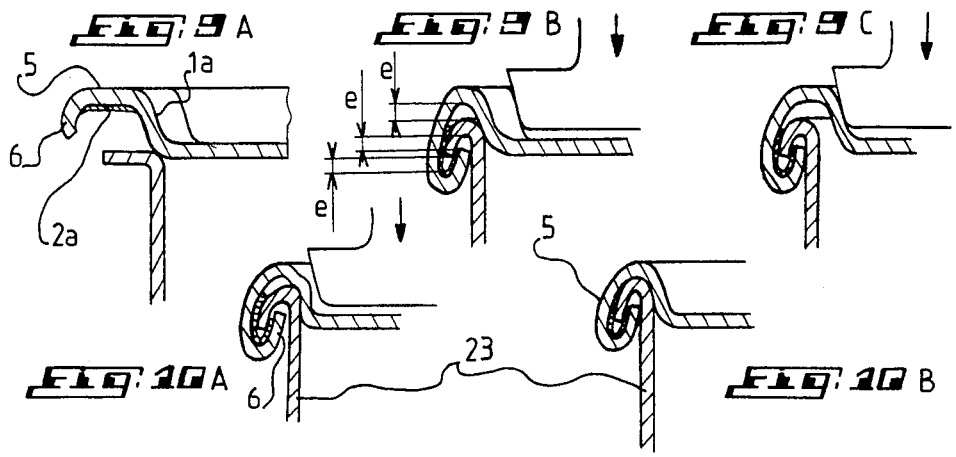

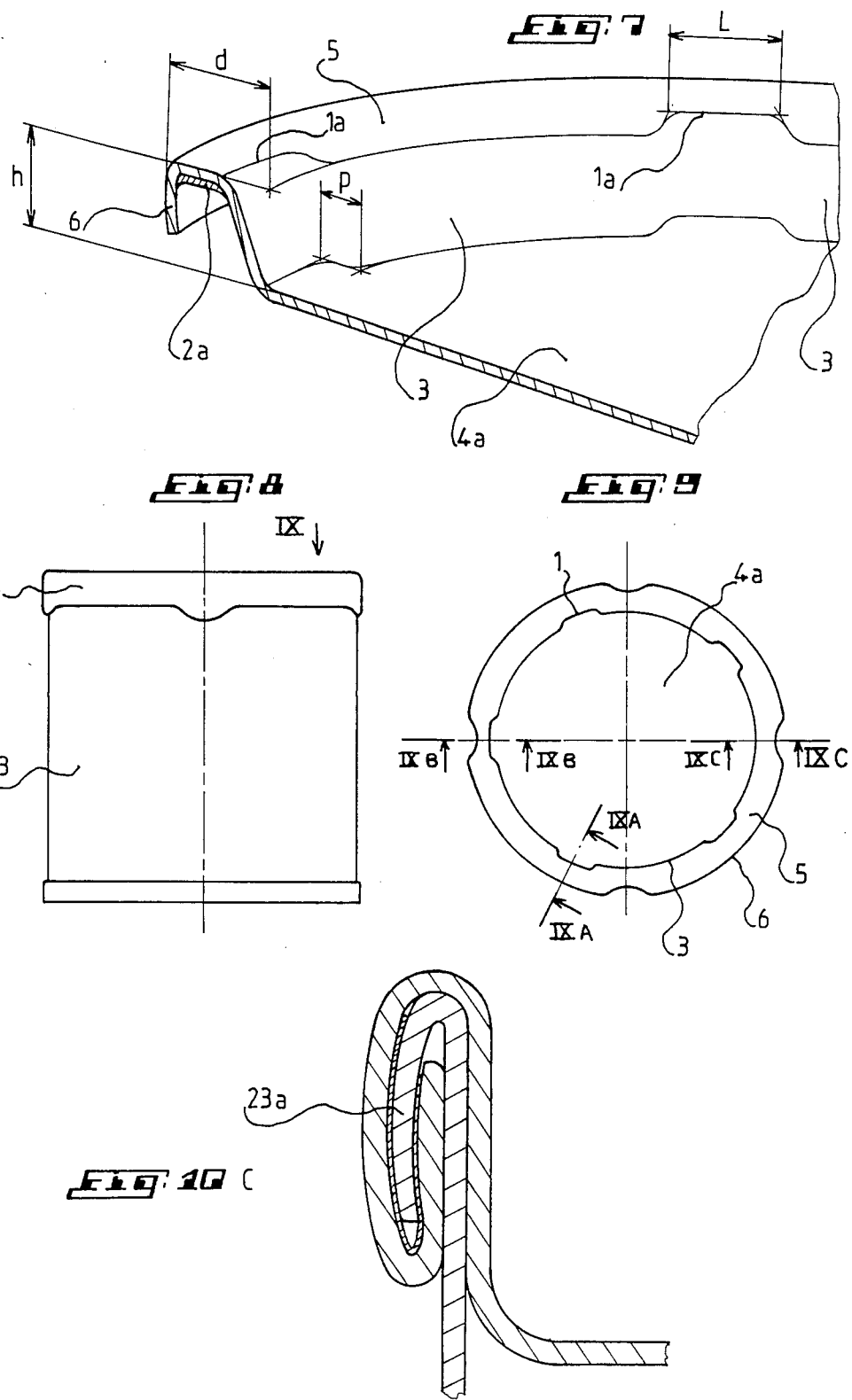

METHOD FOR CANNING FOOD PRODUCT

BACKGROUND OF THE INVENTION

The present invention relates essentially to a preserved or canned aqueous food product or foodstuffs packed under high or deep vacuum, a method of obtaining same, as well as a device for carrying out this process and a container lid or cover and a container adapted to be used for performing the method.

Aqueous foodstuffs or products as meant by or within the scope of the present invention in particular comprise not only products of vegetable origin such for instance as fruits, vegetable, mushrooms but also those of animal origin such as meats and fishes. The expression indeed covers any natural foodstuffs or product likely to be added with water without impairing or damaging the organoleptic qualities thereof.

There are presently known two kinds of processes for preserving such aqueous food products or foodstuffs according to their sensitivity to oxidation.

With products containing substances likely to be spoiled upon being contacted by oxygen, a brining or juicing process is used. The food product and the covering juice or liquid which may for instance be salt water or brine or a golden syrup are introduced into a container or vessel such as for instance; a can or a tin after having undergone a previous treatment to extract or release the gas therefrom. This treatment consists in blanching the food product and heating or warming the juice or brine up to a temperature close to 100° C. Such a process is particularly applicable to green peas packed in cans or jars and is effective to avoid the yellowing of this product and its getting a lucern-like taste. This method however suffers from the following inconveniences:

a dilution in the juice or brine of a part of the nineral salts, vitamins, pigments as well of any kind of molecules providing taste, flavour or tang and scent or smell;

an impairment, adulteration or deterioration of texture qualities caused by longer sterilizing times then those used for the packaging or conditioning of products under vacuum.

With products which are little sensitive to oxidation such for instance as soft maize or corn, a method of preserving under partial vacuum has already been used for many years. This method consists in a preservation of the product under an absolute pressure lower than or equal to 360 mm of mercury column.

According to this known method the product is introduced into a container without any previous blanching and then a few grams of a juice or brine is added before sealing, crimping or seaming the container provided with a closure lid or cover by means of a vacuum sealing, seaming or crimping machine. Thus a food product is obtained which is preserved under an oxygen-containing atmosphere and which is stable since it consists essentially of sugars which are little sensitive to oxidation.

Such a method may however not be used for preserving most of the aqueous food products or foodstuffs since the latter incorporate oxygen-sensitive compounds such as polyunsaturated fatty acids, tannins, vitamins and so on.

SUMMARY OF THE INVENTION

The object of the present invention is to solve the aforesaid problems by providing a preserved aqueous food product the various components of which may not be oxidized during its preservation.

The solution to the technical problem set as proposed by the present invention consists in a preserved aqueous food product contained within a tightly closed rigid container and characterized in that the pressure inside of said container as measured at 20° C. ranges from 3,300 to 6,600 pascals and in that the partial steam pressure is at least equal to 40% of said pressure. Under such conditions of preservation the aqueous food product according to the present invention retains the nutritive characteristic features of the fresh or steam-cooked product. The vacuum level achieved within the container would prevent any uncondensable gases and oxygen from being present therein and provide for the preservation of the fresh or steam-cooked product without any loss of either taste or colour thereof.

The present invention relates also to a method of obtaining or making the aforesaid preserved food product, according to which an aqueous food product is introduced into a rigid container and covered with a covering liquid, the method being characterized in that it comprises: placing the whole unit thus provided into a steam atmosphere substantially devoid of air or uncondensable gas; removing from said container all or a part of said covering liquid in order to substitute said steam therefor; and then tightly closing or sealing said container before or after having subjected said whole unit to a heat treatment while simultaneously subjecting the same to a variation in pressure so as to keep stem evolving, releasing or escaping above therefrom. Thus a full removal of the air or uncondensable gas in the container is provided by replacing the same with a liquid. In fact the inventive gist of such a process consists in replacing all the air or uncondensable gas present in the container with a liquid and then removing the liquid within a condensable gas or vapor atmosphere so that said gas or vapor enters the container and then condenses to thereby provide the required vacuum. When the vacuum level is equal to 3,300 pascals which is the equilibrium pressure between the steam phase and the water liquid phase at 20° C., there may not be any condensable gas present in the container. The pressure of 6,600 pascals would represent the highest tolerable limit of presence of uncondensable gas within the container allowing the preservation of the product without any loss of its aforesaid properties. Moreover by keeping steam evolving or escaping in particular during the clamping step, any air intake liable to impair the good preservation of the product is thus avoided.

The present invention relates further to a plant or apparatus for carrying out the aforesaid method, which is characterized in that it comprises an enclosed space in which is maintained a steam atmosphere, an inlet lock-chamber, means for withdrawing the containers from said inlet lock-chamber, a device for removing all or a part of the cove-ring liquid contained within said containers, and means for withdrawing said containers from said enclosure. According to a particular characterizing feature of the invention with a view to remove the liquid without any loss of product, there is moreover used a perforated cover plate or cap which is put onto and made fast with the opening rim or edge of each container.

The use of such a perforated cover plate or cap results upon the fluid-tight sealing or closing of the contaienr in the necessity of providing either a previous sterilizing step of the lid requiring a specific expensive plant or system or an additional sterilizing step for the whole container and lid assembly after sealing or seaming thereof.

Furthermore said perforated cover plate is permanently positioned at one end of each container, so that the opening of the container, when using the food product held thereby, has to be carried out at the opposite end thus requiring during manufacture an extra-device for marking the side or end to be opened.

The object of the present invention is also to cope with such drawbacks by substituting, in a presently preferred embodiment thereof, for the perforated cover plate or cap, a particular lid shaped to allow for a partial closing of the container hence the removal of the liquid, whereby it is possible to sterilize the lid at the same time as and together with the can or tin and its content.

The solution to such a problem as proposed by the invention consists in the provision of a container lid of the type comprising on its inner side or face a peripheral groove adapted preferably to accommodate a seal or gasket onto its bottom wall and to receive or house the top rim or upper edge of the container body, said peripheral groove being defined outwards by a peripheral flange which may be seamed or fastened, clamped or stapled onto the opening rim or edge of said container body, the lid being characterized in that it is formed with at least two and preferably more linearly spaced bosses projecting into said groove and provided on the inner side wall thereof.

The present invention relates further to a container, can or tin or the like provided with a lid such as previously described and characterized in that the lid is fastened or secured through partial local clinching to the container so that the bosses of the lid are inside in abutting engagement with the edge or rim of the container body while leaving therebetween gaps or intervals, respectively, to provide at least temporarily a partial or incomplete closing to let the aforesaid covering liquid flow out or escape through said gaps. Thus such a container is particularly advantageous because it allows on the one hand the liquid to flow out or escape therefrom and on the other hand the lid, the container and its contents to be sterilized at the same time.

The present invention is finally directed to a method of tightly closing a filled preserved-food can or tin or like rigid container with a lid such as previously described and which consists, after having clinched the lid locally at discrete points onto the top edge or upper rim of the can body, in driving forcibly said lid in until the edge or rim of the can body comes into abutting engagement with the bottom wall of the groove with attendant upsetting of the material of the bosses which is forced back radially inwards until they vanish, thereby making uniform the cross-sectional shape of said groove to allow subsequent fastening or clamping and seaming operations to take place.

BRIEF DESCRIPTION OF THE DRAWINGS

The invention will be better understood and further objects, characterizing features and advantageous thereof will appear more clearly from the following explanatory description with reference to the accompanying diagrammatic drawings given by way of non limiting examples only illustrating presently preferred embodiments of the invention and wherein:

FIG. 1 is a general view of a device or a plant according to a first embodiment for carrying out the method of obtaining a preserved or canned food product according to the invention;

FIG. 2 is a view of a second embodiment of the invention showing the principle of a liquid discharging or removing chamber of the plant illustrated in FIG. 1;

FIG. 3 is a diagrammatic view of an embodiment of said device for removing or discharging the covering liquid from the cans when a perforated cover plate is used;

FIG. 4 is a top view on an enlarged scale of the lid according to a preferred embodiment of the invention;

FIG. 5 shows a cross-section taken upon the line V—V of FIG. 4;

FIG. 6 is an enlarged partial view of the detailed portion a of FIG. 5;

FIG. 7 is a fragmentary perspective view of the top side of a portion of the lid cut or in section along a diametral plane forming a plane of symmetry of a boss and extending through the middle thereof;

FIG. 8 is an outside elevational view on a smaller scale of a can having its top end closed by a lid secured through clinching at four diametrally opposite points and formed with five bosses;

FIG. 9 is a top view of the clinched lid as viewed in the direction of the arrow IX of FIG. 8;

FIG. 9A is a partial view on an enlarged scale in cross-section taken upon the line IX A—IX A of FIG. 9, showing the non-clinched edge flange of the lid onto the can body in front of a boss;

FIG. 9 B is a similar fragmentary view in cross-section taken upon the line IX B—IX B of FIG. 9, showing the lid edge flange clinched in registration with a boss and the corresponding adjacent portion of the clinching tool;

FIG. 9C is a similar partial view in cross-section taken upon the line IX C—IX C of FIG. 9, showing the edge flange of the lid clinched at a hemmed portion thereof devoid of a boss;

FIGS. 10A and 10B are similar partial views in radial cross-section, respectively, illustrating two successive operating steps of fastening or clamping the edge flange of the lid onto the rim of the can body with the clamping tool partially shown on FIG. 10A;

FIG. 10C is a similar partial view in radial cross-section of the lid edge flange and its seamed or crimped condition onto the rim of the can body; and FIG. 11 is a partial perspective view on an enlarged scale of a lid showing in particular the specific shape of a boss.

DESCRIPTION OF THE PREFERRED EMBODIMENTS

A food product such as previously defined is filled into an upstanding rigid container such as for instance a metal can or tin or a jar. A covering liquid is then added into the container to the brim so as to be fully substituted for the air or uncondensable gas present therein. The covering liquid may for instance be water, salt water or brine or a golden syrup.

The whole airless unit thus provided is introduced into a so-called emptying enclosure wherein an also airless steam atmosphere also prevails. Within this atmosphere the covering liquid is removed at least partially or preferably substantially wholle so as to substitute steam therefor within the container. For that purpose, the container provided or not with partial closing means is tilted or tipped or upset or turned upside down into inverted position as will be explained hereinafter with reference to the various embodiments of the plants for performing the method according to the invention. Moreover, to make the work easier and to avoid any presence of air within the emptying enclosure, it may be advantageous for the steam to be superheated.

The whole unit having been brought back into tis normal upright position, i.e. with the opening edge or rim of the container located upwards, said container is hermetically closed while subjecting the whole assembly consisting of the product and of the container holding the same to a decrease in pressure. It is thus possible during this operating step to maintain an evolvement, escape or release of steam above the container thereby preventing any air hence oxygen from entering the same.

According to a first embodiment of the invention, this fluid-tight closure is carried out by a vacuum-seaming or clamping device. For that purpose the covering liquid is substituted by steam at a pressure equal to or slightly higher than atmospheric pressure. The container is then hermetically closed or sealed with a vacuum-seaming or crimping machine and in such a case a heat treatment such as sterilization or pasteurization after closure of the container is required.

According to a second embodiment of the invention, the hermetic closure is performed with a normal seaming or sealing device, i.e. operating under atmospheric pressure. For that purpose the steam pressure within the emptying enclosure is then strictly higher than atmospheric pressure and the container is tightly closed or hermetically sealed with a seaming or a crimping device operating in the atmosphere. In such a case the products with a strong acidity (pH-value lower than 4.5) would not require any further heat treatment. On the contrary products with a high pH-value (higher than 4.5) should undergo a heat treatment after closing of the container.

According to a third embodiment of the invention, the hermetic sealing or fluid-tight closure is carried out with a seaming device operating under pressure, i.e. working inside of an enclosure kept under a pressure strictly above atmospheric pressure. For that purpose, the steam pressure prevailing within the emptying enclosure should be strictly higher than atmospheric pressure or equal to the pressure of the seaming applicance. In such a case the steam pressure hence the steam temperature provide for a sterilization or a pasteurization of the product during the aforesaid substitution and a heat treatment after closure would therefore be useless.

The product obtained with said process accordingly is an aqueous food product contained within a tightly closed or sealed container. The pressure as measured at 20° C. inside of this container has a value between 3,300 and 6,600 pascals whereas the partial pressure of the steam is at least equal to 40% of this pressure.

FIG. 2 diagrammatically shows an emptying enclosure 21 according to a first embodiment of the invention, inside of which is maintained by any known means a steam atmosphere with a pressure above or equal to atmospheric pressure.

At the lower part of this enclosure is provided an inlet lock-chamber 22 into which are fed in a row open rigid containers 23 holding an aqueous food product covered with a covering liquid. In extension of this inlet lock-chamber 22 is arranged a first endless belt conveyor 24 for carrying along the containers 23 issuing from the inlet lock-chamber 22.

Above this endless belt conveyor 24 and in the vicinity thereof is arranged a perforated magnetic endless belt conveyor 25 extending substantially over the whole length and throughout the height of the enclosure 21.

At the upper part of the enclosure 21 and below and near the end portion 20 of the lower side or run of the magnetic belt conveyor 25 is arranged a second substantially horizontally extending endless belt conveyor 26 leading to an outlet lock-chamber 27.

The upright open container 23 holding an aqueous food product together with a covering liquid are taken from the lock-chamber 22 by the first belt conveyor 24. These containers 23 are then attracted by the magnetic conveyor 25 on its lower side or run portion located above the first belt conveyor 24 and the containers would therefore stick to the belt conveyor 25 with their open top end face.

The magnetic belt conveyor 25 preferably follows a sinuous path of travel where the containers on some portions of said path of travel, when passing from a lower run portion to an upper run portion of the conveyor, are turned upside down into an inverted position thereby causing the liquids contained in the containers to flow out or be removed therefrom through gravity through the perforations or holes provided in the magnetic belt conveyor. The angle of tilt of the conveyors with respect to the vertical direction is therefore in that instance of substantially 180°. Moreover as the liquid is removed or escapes the steam present in the enclosure would enter the containers 23.

At the upper part of the enclosure 21 the containers 23 righted to their normal upstanding position would leave the belt conveyor 25 through discontinuation of the magnetic field and are taken over by the second belt conveyor 26 to be moved towards the outlet lock-chamber 27. Then the containers 23 issuing therefrom and with steam still escaping or being released therefrom are moved towards an hermetic closing device such as a sealing or seaming machine located for instance within a seaming chamber next and contiguous to or adjoining the emptying enclosure 21. The seaming operation is performed according to one of the methods previously described and the pressure under which the seaming device is operating should compulsorily be lower than the pressure prevailing or built up inside of the enclosure 21 so that there is always a pressure differential promoting an evolvement, escape or release of steam from and above the upright containers 23 even during the seaming step.

According to another embodiment in order to remove the liquid without any loss of product there is additionally used a perforated cover or cap plate 28 which is put or laid into each container 23 and made fast therewith by any suitable means.

With reference to FIG. 3 of the drawings the containers 23 provided with this perforated cover plate are fed as before into an emptying enclosure through the agency of an inlet lock-chamber 22.

At the outlet of the lock-chamber 22 the containers are laid down or put into a horizontal or recumbent position for instance by means of a turning field or contrivance 29 and are then put on rails 30 on which they would roll or ride while discharging their covering liquid therefrom and being simultaneously filled with steam, the fluid exchange being effected through the perforated cover plate 28.

At the end of the rails 30 is provided an outlet lock-chamber 31 in the shape of a turret or star-sheel like valve for extracting the containers 23 which thereafter are righted and then hermetically closed or sealed as previously, the perforated cover plate 28 remaining permanently in position within the container.

In a presently preferred method according to the invention, the perforated cover plate is replaced with a particular lid shaped so as to provide for a partial closing of the container hence the removal or discharge of the liquid within the emptying enclosure, and this lid may thus be sterilized at the same time as the can and its content.

Referring to the FIGS. 4 to 6, a lid 4 according to the invention for a container 23 consists of a substantially flat plate comprising on its inner side face a peripheral groove 2 with a substantially channel-like or U-shaped cross sectional contour in the example shown. As a general rule, the groove 2 may be of any shape and in particular of substantially cylindrical or prismatic configuration. On the bottom wall of the groove 2 is provided a sealing pad or gasket 5 made for instance from a synthetic rubber. The peripheral groove 2 is adapted to accommodate the top rim or edge 23a of the container body, shaped for that purpose.

Moreover the groove 2 is defined outwards by a peripheral edge flange 6 which may be locally "clinched" at discrete points onto the upper rim or top edge 23a of the container body 23 before being clamped and then seamed or crimped thereon. For that purpose the outer peripheral edge flange 6 is formed through bending or folding the edge 5 of the lid 4 radially inwards.

The inner side wall 3 of the groove 2 which is substantially straight in radial cross-section comprises a set of linearly spaced bosses 1 projecting inwards of said groove 2. The bosses are preferably uniformly spaced and they may be in any number in accordance with the diameter of the lid. In the examples shown on on FIGS. 4 and 9, the lid 4 of generally circular shape comprises five bosses 1 angularly spaced uniformly along the circumferential groove 2. The particular shape of each boss is shown on FIGS. 4 to 7, 9, 9A, 9B and 11 and constitutes a part of the invention.

According to a presently preferred embodiment of the invention, each radially outwards projecting convex boss 1 is defined at its radially outer periphery by a bottom wall 1a (see FIG. 7) which for instance may be either substantially flat or substantially cylindrical in coaxial relationship with the circular lid. Each boss has a height h in a direction perpendicular to the in particular substantially flat surface of the bottom of the cup like portion 4a of the lid 4, which height is for instance substantially equal to the depth of this cup. The depth p of the hollow recess or concave portion of each boss advantageously is lower than one half of the radial width d of the hemmed margin or edge flange 5 of the lid 4. The peripheral or circumferential length L of the bottom wall 1a of each boss 1 is for instance of about 5 mm (see FIGS. 6 and 7).

FIG. 8 shows a preferably cylindrical round container or can 23 together with its lid 4 comprising for instance five bosses and clinched at four points which are in particular diametrally opposite by pairs located in two diametral for instance orthogonal planes, respectively (see FIG. 9).

FIG. 9A shows the lid 4 merely laid and resting before being clinched onto the top rim or upper edge 23a of the can 23 defining the opening thereof and it is seen that the space or gap e between the edge 5 of the lid 4 and the rim 23a of the can is relatively large.

FIG. 9B shows the lid 4 clinched in front of or in registration with a boss 1 onto the rim or edge 23a of the can and it is seen that the lid is not engaging with the bottom wall of its groove 2 the creased or flanged edge 23a of the lid but is spaced therefrom by the distance e.

FIG. 9C shows the lid 4 clinched with a hemmed portion 5, devoid of any boss, onto the rim of the can in such a way that the space e between the convex top bend of the rim and the concave top bend of the lid flange is smaller than the space between the downward directed end edge of the rim and the concave bottom fold of the lid flange as well as between the upward directed end edge of the lid flange and the concave top bend of the rim.

With the lid clinched onto the can, passage-way are left in the circumferential direction between the lid and the can body at the portions thereof located between the bosses and clinched points, thereby allowing any liquid contained in the can to flow out or to be discharged therefrom upon tilting or tipping the can or upon turning same upside down in an inverted position.

According to a presently preferred embodiment of the lid 4 of the invention, the lid comprises a number of reinforcing ribs, steps or lifts 7 adding to its stiffness as shown in particular on FIGS. 4 and 5.

After a food product has been filled into a rigid container 23 and then a covering liquid added brimful therein, the lid 4 undergoes a local or partial so-called "clinching" operation, so that the bosses 1 of the lid 4 are inside in abutting engagement or bear against the rim, or edge of the container body 23. The clinching step is shown on FIGS. 9B or 9C of the drawings in front of or in registration with a boss and at a portion without any boss, respectively. Such a step consists in folding or bending over the peripheral edge flange 6 of the lid so as to freely connect the latter with the container body 23. The opening rim or edge of the container body 23 is in fact confined, encompassed or held back while leaving a clearance or a gap between the outer wall of the bosses 1 and the end edge of the peripheral flange 6. As is shown in particular in Figures 9 and 9A, between any boss 1 and a next boss or nearest clinched point a passage-way clearance or gap is left allowing the escape of the covering liquid. This passage-way gap or clearance is formed between the top rim of the container 23 and the bottom wall of the lid groove 2. Thus the lid according to the invention provides a temporary partial or incomplete closing of the container 23 thereby allowing, for instance through tilting or tipping of the latter, the desired removal or discharge of the covering liquid therefrom.

Reverting to FIG. 1 of the drawings, there is shown a presently preferred plant for carrying out the method of obtaining a canned food product according to the invention. This device comprises an inlet lock-chamber 10 opening with one end into an emptying enclosure 11 filled with saturated steam at a temperature of for instance 100° C. The enclosure 11 communicates through the medium of a transfer lock system 12 with a sterilizing chamber 13 filled with steam at a temperature of for instance 130° C. This chamber 13 opens at its lower part into a seaming or a crimping chamber 14. The seaming chamber 14 is filled either with steam or with air at a pressure lower than the pressure prevailing within the sterilization chamber 13. Moreover the seaming chamber communicates with an outlet lock-chamber 15.

In the inlet part of the emptying enclosure 11 and in the seaming chamber 14 devices are provided (not shown) for respectively laying down horizontally and re-righting the containers.

Moreover the conveyance of the containers along the path of travel leading them from the inlet lock-chamber 10 to the outlet lock-chamber 15 and extending through the chambers 11, 12, 13 and 14 is provided by means of an endless rung chain conveyor reeved over sprockets and carrying and guiding preferably on both sides each container previously laid down by means of the aforesaid device. There are moreover advantageously provided guide and ride or track rails onto which the containers are resting and may freely ride or roll and revolve within the moving chain.

The containers into which the food product has been introduced and which have been filled brimfull with the covering liquid are introduced in a line or row into the inlet lock-chamber 10 after a lid has been locally clinched at discrete points, in particular near at least some of said bosses onto the top rim of the body of each container. The clinching step is performed through deformation of the outer edge flange or border of the peripheral groove of the lid radially inwards so as to fully connect the container rim with the outer edge flange of the lid.

Prior to the seaming operation the lid 4 is forcibly driven in until the rim 23a of said container body 23 comes into abutting engagement against the bottom wall of the groove 2 with attending upsetting and forcing back of the material of the bosses 1 (FIG. 10A) radially inwards until they vanish, thereby restoring the uniform cross-sectional shape of the groove 2. This is followed by the known clamping or fastening steps (FIG. 10B) and seaming or crimping steps (FIGS. 10C) with a view to tightly connect the lid and the container body in sealing relationship with each other, owing to the removal thus achieved of any projecting or recessed portion on the radially inner side wall of the groove 2.

As a general rule, prior to the seaming step the temperature and the pressure are made such that the residual water container within the can and the water contained in the product begin to boil thereby causing a vaporization (evolvement or release of steam) and then the seaming operation as carried out. Thus by way of first example assuming that the pressure within emptying enclosure 11 is of 1 bar, the seaming operation may then take place either under a pressure lower than 1 bar to cause evolvement of steam prior to the seaming step and then the sterilizing operation is carried out, or a pressure of for instance 2.5 bars but after a sterilizing step performed at a higher pressure for instance of 2.7 bars and at a temperature of 130° C. It is this case which is illustrated with the device shown in FIG. 1. According to another assumption the pressure built up or prevailing in the emptying enclosure 11 may be selected to be above one atmosphere and in such a case the seaming operation is carried out at a maximum pressure of one atmosphere also, enabling steam to evolve.

What is claimed is:

1. A method of obtaining a canned food product, packed under high vacuum in a hermetically closed rigid container, said product being capable of being added with water without impairing or damaging the organoleptic qualities thereof, comprising the steps of:
    filling food product into a rigid container;
    then adding to said container to the brim a covering liquid so as to fully substitue said liquid for air or uncondensible gas present in said container;
    then placing the whole unit thus provided within a substantially airless steam atmosphere;
    removing from said container at least a part of said covering liquid while in said steam atmosphere, so as to substitute steam therefore;
    and then hermetically closing said container, before or after having subjected the whole unit to a heat treatment while subjecting the same simultaneously to variation in pressure so as to keep steam evolving from and above the container, thereby achieving within the container such a vacuum level to prevent any uncondensible gases and oxygen from being present therein and to provide for the preservation of said food product without any loss of either taste or color thereof.

2. A method according to claim 1, wherein said covering liquid is removed by tilting the container within said steam atmosphere.

3. A method according to claim 1, wherein said container is hermetically closed under a pressure lower than that of the steam atmosphere.

4. A method according to claim 1, wherein prior to the aforesaid step of placing the whole unit within the substantially airless steam atmosphere, said container is provided with partial closing means.

5. A method according to claim 1, additionally comprising, prior to the aforesaid step of placing the whole unit within the substantially airless steam atmosphere, fastening through local partial clinching, a lid of the type comprising on an inner side face a peripheral groove adapted to accommodate on a bottom wall thereof a sealing gasket and to receive a top rim of the container and formed with linearly spaced bosses projecting inwardly of said groove and provided on an inner side wall thereof, so that the bosses of said lid are inside in abutting engagement against the rim of the container, while leaving gaps between any boss and a next boss or nearest clinched point, thereby resulting in an at least temporary partial closure with passage-ways between the container rim and lid for removing said covering liquid.

6. The method of claim 1, wherein the vacuum level thus achieved is from 3,300 to 6,600 pascals as measured at about 20° C.

* * * * *

UNITED STATES PATENT AND TRADEMARK OFFICE
CERTIFICATE OF CORRECTION

PATENT NO. : 4,717,575
DATED : January 5, 1988
INVENTOR(S) : Michel H. R. Larroche It is certified that error appears in the above—identified patent and that said Letters Patent is hereby corrected as shown below:

(30) Foreign application priority data

Mar. 22, 1984 (FR) France ..... 84 04437

Signed and Sealed this

Third Day of January, 1989

Attest:

DONALD J. QUIGG

Attesting Officer

Commissioner of Patents and Trademarks